Dec. 1, 1959 W. H. CHUDLEIGH, JR., ET AL 2,915,648

FREQUENCY SENSITIVE CIRCUIT

Filed Nov. 21, 1955

INVENTORS
WALTER H. CHUDLEIGH, JR.
RICHARD W. YUTZ

BY

ATTORNEY

United States Patent Office 2,915,648

Patented Dec. 1, 1959

2,915,648

FREQUENCY SENSITIVE CIRCUIT

Walter H. Chudleigh, Jr., Catonsville, Md., and Richard W. Yutz, Oreland, Pa., assignors to Philco Corporation, Philadelphia, Pa., a corporation of Pennsylvania Application November 21, 1955, Serial No. 548,190

7 Claims. (Cl. 307—88.5)

This invention relates to frequency standards and more particularly to circuits for establishing an accurate and stable frequency reference.

Frequency reference circuits of the prior art normally employ tuned inductor-capacitor circuits or mechanically resonant elements such as reeds or crystals as the frequency sensitive elements. These prior art circuits are temperature sensitive, expensive and bulky. Furthermore the inductor-capacitor circuits and crystal circuits are not well adapted to low frequency operation. Crystals have a lower limit of operation of 2 to 4 kilocycles per second. Inductor-capacitor circuits may be employed below one hundred cycles but the circuits required to obtain a sharp frequency response are complex, bulky and expensive. Mechanical reed filters are difficult and expensive to construct and cannot be modified readily to shift the frequency of operation.

Therefore it is an object of the present invention to provide a simple, novel frequency reference circuit which is free of these disadvantages of prior art circuits.

It is a further object of the present invention to provide a novel frequency reference circuit which does not employ tuned circuits or mechanically resonant elements.

Still another object of the present invention is to provide an extremely stable circuit having a definite, sharp cut-off frequency which may be varied over a wide range of operating frequencies including the very low frequency range.

An additional object of the present invention is to provide a frequency reference circuit in which the threshold frequency is independent of input signal amplitude.

These and other objects of the present invention are achieved by providing a novel clamp circuit which produces from an oscillatory input signal a rectangular voltage wave which is referenced with respect to ground. Means are provided for integrating this rectangular wave to provide a saw-tooth wave having an amplitude which is a function of both the amplitude and frequency of the rectangular wave, additional means are provided for obtaining a reference voltage proportional to the amplitude of the rectangular wave but independent of the frequency thereof, and finally means are provided for comparing the amplitude of said sawtooth wave with the amplitude of said reference voltage, thereby to obtain a signal which is indicative of the frequency of the rectangular wave.

For a better understanding of the invention together with other and further objects thereof, reference should now be made to the following detailed description which is to be read in conjunction with the accompanying drawings in which.

Figure 1:
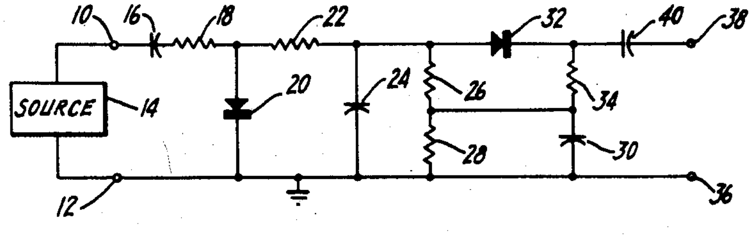
Fig. 1 is a schematic diagram of one preferred embodiment of the invention.

As shown in Fig. 1, the preferred embodiment of the invention is provided with terminals 10 and 12 to which a source of signals 14 may be connected. Terminal 12 is connected directly to the point of reference potential for the circuit of Fig. 1. This point is represented by the ground symbol in Fig. 1. Terminal 10 is connected through the series circuit comprising capacitor 16 and resistor 18 to the anode terminal of a crystal diode 20. The second terminal of crystal diode 20 is connected directly to the point of reference potential. Capacitor 16 is a blocking capacitor and it may have any convenient value which makes it a low impedance at the operating frequency of the circuit. The value of resistor 18 depends upon the voltage supplied by source 14 and upon the characteristics of the crystal rectifier 20. In general, resistor 18 should have a value equal to the voltage supplied by source 14 minus the Zener voltage of crystal rectifier 20 divided by the maximum allowable reverse current of crystal rectifier 20. This value of resistance will limit the maximum reverse current through crystal rectifier 20 to a safe value. Another limitation on resistor 18 is that it should have a resistance which is large compared to both the forward impedance of the crystal rectifier 20 and the reverse impedance of rectifier 20 for voltages beyond the Zener voltage. As will be shown presently, capacitor 16, resistor 18 and crystal rectifier 20 form a clamp circuit which produces a square wave having one excursion at the potential of terminal 12 and the other excursion at the negative Zener voltage of crystal rectifier 20. This square wave appears across the crystal rectifier 20.

A series circuit comprising resistor 22 and capacitor 24 is connected in shunt with crystal rectifier 20. Resistor 22 and capacitor 24 together form an integrator circuit for producing a substantially sawtooth voltage waveform across capacitor 24 which has a peak to peak excursion which is a function of the amplitude of the square wave appearing across crystal rectifier 20 and is also a function of the frequency of this wave. Resistor 22 preferably has a value large compared to the impedance of crystal rectifier 20 and resistor 18 so as not to load down the source of square wave signal. It has been found that a value of approximately one megohm is satisfactory for operation at 70 cycles per second. Capacitor 24 has a value such that $$f=\frac{1}{2kR_{22}C_{24}}$$

where F is the desired frequency of operation and $k$ is a constant having a value of aproximately 1. This limitation on the value of $k$ arises from the fact that the peak to peak value of the sawtooth voltage appearing across the capacitor 24 is an exponential function of the period of the square wave. It can be shown that the rate of change of this peak to peak value with small changes in the period of the square wave about the reference frequency is a maximum when the time constant of the integrator circuit is approximately equal to a half period of the square wave. Since the frequency sensitivity of the present circuit depends upon the rate of change of the maximum peak to peak value across capacitor 24 in the region of the reference frequency, any departure from the optimum time constant of this integrator circuit will reduce the frequency sensitivity of the circuit. However in practice it has been found that values of $k$ between the limits of .5 and 1.5 will give satisfactory results in most instances.

A potential divider circuit comprising resistors 26 and 28 in series is connected in shunt with capacitor 24. The total resistance of this potential divider circuit should be large compared to resistor 22 in order not to load down the integrator circuit. A total resistance for resistor 26 and resistor 28 equal to or greater than ten times the resistance of resistor 22 has been found to be satisfactory. It will be shown presently that the voltage division ratio of the divider comprising resistor 26 and resistor 28 is a function of the selected value of $k$. As will be seen presently, resistors 22, 26 and 28 and capacitor 24 form parts of the frequency sensitive portion of the circuit. Therefore, these elements should be precision elements and should be so constructed as to be temperature insensitive. A capacitor 30 is connected in shunt with resistor 28. Capacitor 30 provides a substantially complete bypass to ground for the sawtooth signal appearing across resistor 28. Therefore the signal at the ungrounded terminal of capacitor 30 will be a D.C. potential which is a preselected fraction of the average value of the sawtooth wave appearing across capacitor 24. This voltage is proportional to the amplitude of the square wave but independent of the frequency of the square wave.

The ungrounded terminal of capacitor 24 is connected to the anode terminal of the second crystal diode 32. The other terminal of crystal diode 32 is connected to the ungrounded terminal of capacitor 30 through a current limiting resistor 34. Resistor 34 also serves as a load resistor across which the output signal is developed. Therefore it should have a value large compared to the conductive impedance of crystal diode 32. Diode 32 and resistor 34 together form an amplitude comparison circuit for comparing the peak amplitude of the voltage signal appearing across capacitor 24 with a preselected fraction of the average value or D.C. component of voltage appearing across this capacitor.

The output terminals of the circuit are shown at 36 and 38. Terminal 36 is connected to the point of reference potential and terminal 38 is connected to the junction of crystal rectifier 32 and resistor 34 through a D.C. blocking capacitor 40.

Figures 2, 4:
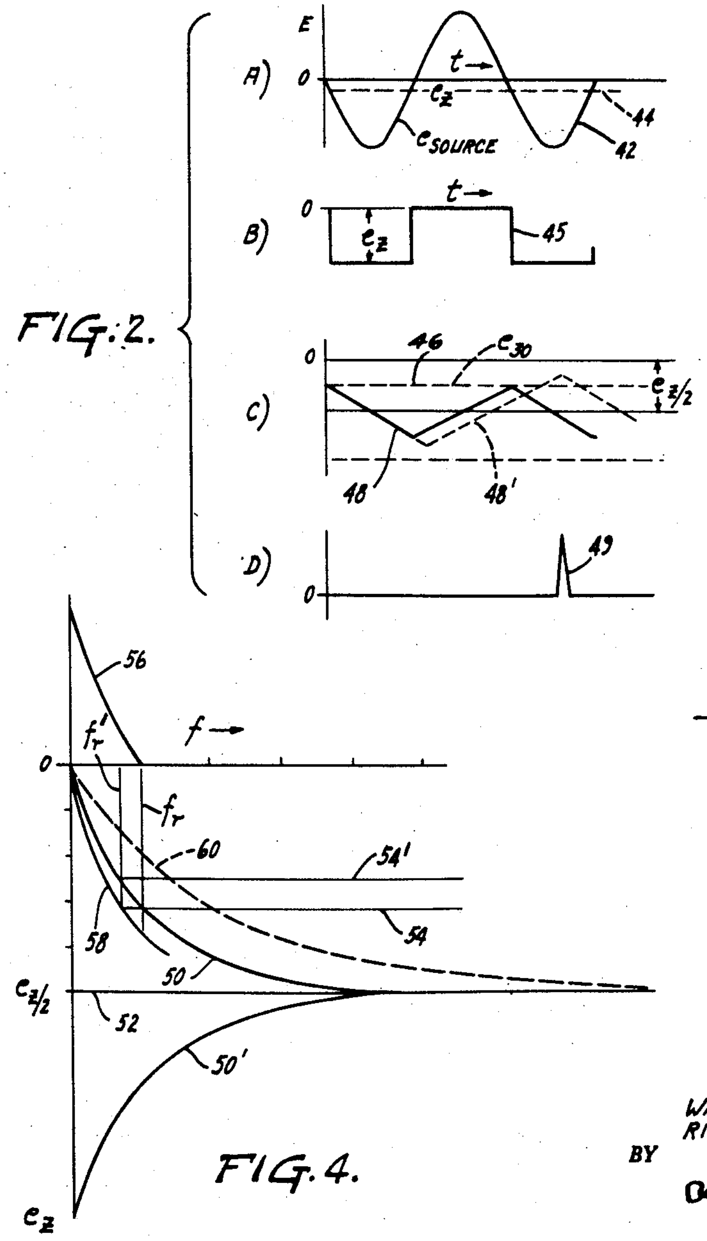
Fig. 2 is a series of waveforms which illustrate the operation of the system of Fig. 1.
Fig. 4 is a set of characteristic curves for the system of Fig. 1.
Figure 3:
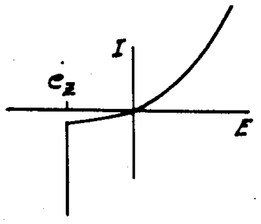
Fig. 3 is a characteristic curve of one of the elements of Fig. 1.

The function of the circuit of Fig. 1 is to provide a distinctive change in the output signal when the frequency of the signal supplied by source 14 is equal to some preselected reference frequency. The circuit of Fig. 1 provides no signal between terminals 36 and 38 if the frequency of the signal supplied by source 14 is above the preselected reference frequency. A signal first appears at terminals 38 and 36 at the reference frequency and this signal then increases in amplitude with any decrease in the frequency of the signal below the preselected reference frequency. The operation of the circuit of Fig. 1 will be explained with respect to the waveforms of Fig. 2. These waveforms are all plots of signal amplitude against time. The time scale is the same for all waveforms but the signal amplitude scale varies from waveform to waveform. Turning now to Fig. 2, waveform 42 of Fig. 2A is a time-voltage plot of the signal supplied by source 14. This signal is shown as having a sinusoidal time-voltage waveform but the present invention is not limited in its use to waveforms of this type. All that is required is that a signal be periodic and that it have a value above the Zener voltage of crystal rectifier 20 for approximately one-half of the cycle. This Zener voltage is shown in Fig. 2A by the broken line 44. Fig. 2B is a time-voltage plot of the signal appearing across crystal rectifier 20. The voltage scale for Fig. 2B is greatly enlarged from that of Fig. 2A. As shown by waveform 45 in Fig. 2B the potential across crystal rectifier 20 will be substantially zero for all positive values of the waveform of Fig. 2A. This results from the fact that resistor 18 is large compared to the conducting impedance of crystal rectifier 20, and hence substantially all of the signal voltage on the positive half cycle appears across resistor 18. On the negative half cycle of the waveform of Fig. 2A the voltage across crystal rectifier 20 rises to the Zener voltage and then limits sharply due to the abrupt change in the current-voltage characteristic of the crystal rectifier at the Zener voltage. Fig. 3 is a plot of current through a crystal diode as a function of the voltage applied across it. This curve illustrates the sharp rise in current through the diode when the applied voltage is made more negative than the Zener voltage. This sharply rising characteristic of the current-voltage curve limits the maximum voltage across crystal rectifier 20 to approximately the Zener voltage.

Fig. 2C is a plot of the voltage appearing across capacitor 24 as a function of time. The broken line 46 respresents the D.C. potential appearing across capacitor 30 as a result of the voltage divider action of resistors 26 and 28. As shown in Fig. 2C the sawtooth voltage 48 which appears across capacitor 24 varies about a D.C. level equal to one-half the Zener voltage of crystal rectifier 20. This D.C. level is the average value of the square wave applied to the integrator circuit. The rate of rise or fall of sawtooth voltage waveform 48 is a function of the time constant of the circuit including resistor 22 and capacitor 24 and the amplitude of the square wave of Fig. 2B. The maximum amplitude of this rise is a function of this rate of rise and of the period of the waveform of Fig. 2A. The cathode of diode 32 is at the potential represented by broken line 46 and the anode of diode 32 varies in the manner represented by waveform 48. As shown in Fig. 2C, at the frequency of the signal shown in Fig. 2A the sawtooth waveform 48 reaches but never becomes more positive than the potential represented by line 46 so that there is never any conduction through crystal rectifier 32. Therefore, there is no signal developed across resistor 34 and no signal appears at output terminals 36 and 38. The potential at the anode of rectifier 32 never becomes negative with respect to the cathode by an amount greater than the Zener potential of crystal rectifier 32. Therefore, there is never the reverse conduction through crystal rectifier 32 corresponding to the negative conduction through crystal rectifier 20. It should be clear from Fig. 2C that if the frequency of the signal from source 14 increases, thereby decreasing the period of the sawtooth wave, the peak to peak amplitude of this sawtooth wave will decrease and no conduction will take place through crystal rectifier 32. However, if the frequency of the signal from source 14 decreases, thereby increasing the time in which capacitor 24 is permitted to charge, the sawtooth waveform 48 will increase in amplitude as shown at 48' and the potential at the anode terminal of crystal rectifier 32 will exceed the potential at the cathode terminal. When this occurs conduction will occur through crystal rectifier 32 and resistor 34 and a pulse will be generated across resistor 34. This pulse will be superimposed upon the D.C. bias appearing across capacitor 30. However, this D.C. bias is blocked by capacitor 40 so that only the pulse will appear at output terminals 36—38. This output pulse is shown at 49 in Fig. 2D. Since the potential across capacitor 30, the peak to peak amplitude of the sawtooth waveform 48 and the average value of this waveform $$\frac{e_z}{2}$$

are all proportional to the amplitude of the Zener voltage of crystal rectifier 20, any change in the Zener voltage, or any change the amplitude of the square wave appearing across crystal rectifier 20, will not change the frequency at which crystal rectifier 32 first conducts. The amplitude of the pulse 49 of Fig. 2D is a function of the amount by which the frequency of the applied signal is below the reference frequency. The rate at which the pulses increase in amplitude with decreasing frequency is a function of the slope of the sawtooth waveform at the point it intersects the line 46 of Fig. 2C. As mentioned above, this slope is a maximum when the half period of the signal at reference frequency is approximately equal to the time constant of the integrator circuit. It is also directly proportional to the amplitude of the square wave.

Fig. 4 is a plot showing the peak amplitudes of the signals at the anode of crystal rectifier 32 and output terminal 38 as a function of frequency for several values of time constants. Curves 50 and 50' represent the limits of the excursion of voltage across capacitor 24 for a value of $k$ equal to one.

As the curves 50 and 50' of Fig. 4 indicate, if the frequency of the incoming signal is zero or substantially equal to zero, capacitor 24 will have an opportunity to charge to the full Zener voltage on one-half cycle and discharge completely on the other half cycle of the input signal. The curve 50 is the peak amplitude obtained during the discharge cycle and curve 50' is the peak amplitude obtained during the charging cycle. Curves 50 and 50' are mirror images about the average value of the square wave signal supplied to resistor 22. This average value is shown by the line 52 in Fig. 4. The peak to peak amplitude of the signal appearing across capacitor 24 may be determined by determining the vertical distance between curves 50 and 50' for any selected value of frequency. If the potential at the cathode of crystal rectifier 32 is selected to have the value 54 which is equal to the value of curve 50 at the desired reference frequency $f_r$, the peak potential on the anode of crystal rectifier 32 will rise to a value more positive than the potential at the cathode of this rectifier for all values of frequency below $f_r$. The peak value of the signal at output terminals 36—38 is shown at 56. At frequencies above $f_r$ the amplitude of the signal at terminals 36—38 is zero.

It can be seen from Fig. 4 that the reference frequency $f_r$ may be changed in one of two ways. If the ratio of the potential divider 26—28 is changed, the potential at the cathode of rectifier 32 will change to some value such at 54' in Fig. 4. Line 54' intersects curve 50 at a point corresponding to frequency $f_r'$ which becomes the new frequency of reference of the circuit. Alternatively, the new frequency of reference $f_r'$ may be arrived at by leaving the potential at the cathode of rectifier 32 at the value represented by the line 54 and increasing the time constant $R_{22}C_{24}$ by increasing the value of either resistor 22 or capacitor 24 or both to obtain the new curve 58. This new curve 58 intersects line 54 at a point corresponding to the new reference frequency $f_r'$. The second method of changing the frequency reference is preferred since it maintains the desired relationship between the time constant and the half period at the reference frequency which has been represented by the factor $k$. The curve 60 in Fig. 4 represents a lower $R_{22}C_{24}$ product than the curve 50. This curve is included for the purpose of showing the decrease in slope of this curve at the reference frequency as the value of $k$ departs from its optimum value.

It should be obvious from the foregoing discussion that certain modifications may be made in a circuit of Fig. 1 without departing from the teachings of the present invention. For example, resistor 18 and crystal rectifier 20 may be replaced by other means, such as a synchronized multivibrator, for generating a square wave from an input signal. In the event that the signal to be controlled is already a square wave, this square wave signal may be supplied directly to the integrator circuit comprising resistor 22 and capacitor 24. As mentioned earlier, the reference frequency $f_r$ is independent of the amplitude of the signal supplied to resistor 22 and capacitor 24. Increasing the amplitude of the signal supplied to these two elements will merely change the value of the absissae units in Fig. 4 without changing the shape of the curves.

The present invention has been described in terms of a symmetrical square wave supplied to resistor 22 and capacitor 24. However, it is unnecessary that this square wave be symmetrical—that is, the positive and negative half cycles of waveform 42 or the square wave of Fig. 2B need not have equal duration. However, a symmetrical square wave will give a larger dynamic range to the system than an unsymmetrical wave. The square wave derived from the input wave may have one excursion at ground potential and the other excursion at some positive value provided the connections to diode 32 are reversed. Crystal diode 32 may be replaced by any other form of circuit element of similar characteristics. As suggested earlier, one or more of elements 22, 24, 26 and 28 may be made variable in order that the reference frequency may be varied over a selected range. The circuit may be operated in any desired frequency range from the subaudible range to frequencies of the order of hundreds of kilocycles by proper choice of circuit components. In a typical circuit a variation in frequency of the order of one cycle per second at a reference frequency of 80 cycles per second is sufficient to provide an output signal which will control a servo system.

While the invention has been described with reference to the preferred embodiments thereof, it will be apparent that various modifications and other embodiments thereof will occur to those skilled in the art within the scope of the invention. Accordingly we desire the scope of our invention to be limited only by the appended claims.

We claim:

1. A frequency reference circuit for providing a distinctive change in an output signal at a selected frequency of an applied signal, said reference circuit comprising, means responsive to said applied signal for generating a direct voltage, second means responsive to said applied signal for generating a sawtooth wave having a peak to peak amplitude which is proportional to the amplitude of said direct voltage and further proportional to the frequency of said applied signal, the peak of said sawtooth wave which is opposite in polarity to said direct voltage having an amplitude at said selected frequency which is substantially less than the amplitude of said direct voltage, an amplitude comparator means having first and second input connections, means for supplying to one of said input connections a signal comprising said sawtooth wave superimposed on said direct voltage, means for supplying to said second input connection a direct voltage equal to a preselected fraction of said first mentioned direct voltage, said comparator means being responsive only to a signal at said first input connection having an amplitude closer to zero than that of the signal supplied to said second input connection to provide an output signal.

2. A frequency reference circuit for providing a distinctive change in an output signal at a selected frequency of an applied signal, said reference circuit comprising, means responsive to said applied signal for generating a direct voltage, second means responsive to said applied signal for generating a symmetrical sawtooth wave having a peak to peak amplitude which is proportional to the amplitude of said direct voltage and a function of the frequency of said applied signal, an amplitude comparator means having first and second input connections, means for supplying to one of said input connections a signal comprising said sawtooth wave superimposed on said direct voltage, means for supplying to said second input connection a direct voltage equal to a preselected fraction of said first mentioned direct voltage, said comparator means being responsive only to a signal at said first input connection having an amplitude closer to zero than that of the signal supplied to said second input connection to provide an output signal, said preselected fraction being so selected that one peak amplitude of the signal supplied to said first input connection is equal to the amplitude of the signal supplied to said second input connection at said selected frequency of said applied signal.

3. A reference frequency circuit for providing a distinctive change in an output signal at a selected frequency of an applied signal, said reference circuit comprising, means responsive to said applied signal for generating a rectangular wave signal having a frequency equal to that of said applied signal, a resistor-capacitor integrator circuit having a time constant approximately equal to a half period of said rectangular wave at said selected frequency, means for supplying said rectangular wave to said integrator circuit, an amplitude comparator circuit having first and second input connections, means for supplying to one input of said comparator circuit a signal comprising both the direct voltage component and the time varying voltage component of the signal voltage appearing across said capacitor of said integrator circuit, means for supplying to said second input connection of said comparator circuit a direct voltage proportional to a preselected fraction of the direct voltage component of the signal appearing across said capacitor, said comparator circuit being responsive only to a first polarity of the difference in the magnitudes of the signals supplied to said first and second input connections to provide an output signal, said preselected fraction being so selected that one peak amplitude of the signal supplied to said first input connection is equal to the amplitude of the signal supplied to said second input connection at said selected frequency of said applied signal.

4. A reference frequency circuit for providing a distinctive change in an output signal at a selected carrier frequency of an input signal comprising a clipping circuit arranged to receive said input signal, said clipping circuit being further arranged to provide an output signal in the form of a rectangular wave having a frequency equal to the carrier frequency of said input signal, one excursion of said rectangular wave being fixed at a preselected reference potential, a resistor and capacitor in series combination connected to the output of said clipping circuit, the time constant of said resistor capacitor circuit being approximately equal to a half period of said rectangular wave at said selected frequency, a potential divider circuit connected in shunt with said capacitor for direct current signals, said potential divider circuit including first and second end terminals connected to corresponding terminals of said capacitor and an intermediate terminal, a second capacitor connected from said intermediate terminal to said second terminal of said potential divider, said second capacitor having an impedance at said selected frequency which is small compared to the impedance between said first terminal and said intermediate terminal of said potential divider, and a signal comparator circuit connected between said first terminal and said intermediate terminal of said potential divider, said signal comparator circuit being responsive only to a voltage between said first and second terminals of said potential divider which is nearer zero than the potential between said intermediate terminal and said second terminal to provide an output signal, the ratio of said potential divider being so selected that one peak of the voltage, appearing between said first and second terminals of said potential divider at said selected frequency is equal to the potential appearing between said intermediate terminal and said second terminal of said potential divider.

5. A frequency reference circuit for providing a distinctive change in an output signal at a selected frequency of an input signal, said circuit comprising first and second input terminals to which said input signal may be supplied, a first crystal diode having anode and cathode terminals, one of said terminals of said first diode being connected to said second input terminal, a first resistor and first capacitor in series combination connecting the other terminal of said diode to said first input terminal, said resistor being connected to said diode, said first capacitor having an impedance at said selected frequency which is small compared to the impedance of said first resistor, the impedance of said first resistor being large compared to the conducting impedance of said diode, the Zener potential of said crystal diode being small compared to the peak amplitude of said input signal, a second capacitor having a first terminal connected to said second input terminal, a second resistor connecting the second terminal of said capacitor to said other terminal of said diode, the series circuit comprising said second resistor and said second capacitor having a time constant substantially equal to a half period of said input signal, the impedance of said second resistor being large compared to that of said first resistor, third and fourth resistors connected in series, one end of said fourth resistor being connected to said second input terminal, one end of said third resistor being connected to said second terminal of said second capacitor, the other terminals of said third and fourth resistors being connected together, the total impedance of the series combinations of said third and fourth resistors being large compared to that of said second resistor, a third capacitor connected in shunt with said fourth resistor, said third capacitor having an impedance at said selected frequency which is small compared to that of said third resistor, a second diode having an anode and a cathode terminal, the terminal of said second diode corresponding to said other terminal of said first diode being connected to said second terminal of said second capacitor, an impedance connecting the common connection of said third fourth resistors to the terminal of said second diode corresponding to said first terminal of said first diode, said impedance providing a path for direct current between said common connection of said third and fourth resistors and said last-mentioned terminal of said second diode, first and second output terminals, means connecting said first and second output terminals to said last mentioned terminal of said second diode and to said second input terminal respectively.

6. A frequency reference circuit for providing a distinctive change in the output signal at a selected frequency of an applied signal, said reference circuit comprising, means responsive to said applied signal for generating a signal comprising a sawtooth component having a peak-to-peak amplitude which is proportional to the frequency of said applied signal, said sawtooth component being superimposed on a direct voltage having an amplitude which is independent of the frequency of said applied signal, an amplitude comparator means having first and second input connections, means for supplying to one of said input connections said signal comprising said sawtooth component superimposed on said direct voltage, means for supplying to said second input connection a direct voltage equal to a preselected fraction of said first-mentioned direct voltage, said comparator means being responsive only to a signal at said first input connection having an amplitude closer to zero than that of the signal supplied to said second input connection to provide an output signal, said preselected fraction being so selected that one peak amplitude of the signal supplied to said first input connection is equal to the amplitude of the signal supplied to said second input connection at said selected frequency of said applied signal.

7. A frequency reference circuit for providing a distinctive change in an output signal at a selected frequency of an applied signal, said reference circuit comprising, means responsive to said applied signal for generating a signal comprising a sawtooth component having a peak-to-peak amplitude which is proportional to the frequency of said applied signal, said sawtooth component being superimposed on a direct voltage having an amplitude which is independent of the frequency of said applied signal, an amplitude comparator means comprising a diode in series with an impedance, means for supplying to one terminal of said series combination said signal comprising said sawtooth component superimposed on said direct voltage, means connected to the output of said signal generating means for deriving a second direct voltage from said signal comprising a sawtooth component superimposed on a direct voltage, said second direct voltage being equal to a preselected fraction of said first mentioned direct voltage, means connecting the output of said last-mentioned means to the other terminal of said series combination, said preselected fraction being so selected that one peak amplitude of the signal supplied to said first named terminal is equal to the amplitude of the signal supplied to said second mentioned terminal at said selected frequency of said applied signal, and means for deriving an output signal from the impedance in said comparator means.

References Cited in the file of this patent

UNITED STATES PATENTS

| | | |
|---|---|---|
| 2,357,652 | Haynes | Sept. 5, 1944 |
| 2,419,340 | Easton | Apr. 22, 1947 |
| 2,503,835 | Montgomery | Apr. 11, 1950 |
| 2,621,290 | Andresen | Dec. 9, 1952 |
| 2,789,267 | Beal et al. | Apr. 16, 1957 |